UNITED STATES PATENT OFFICE.

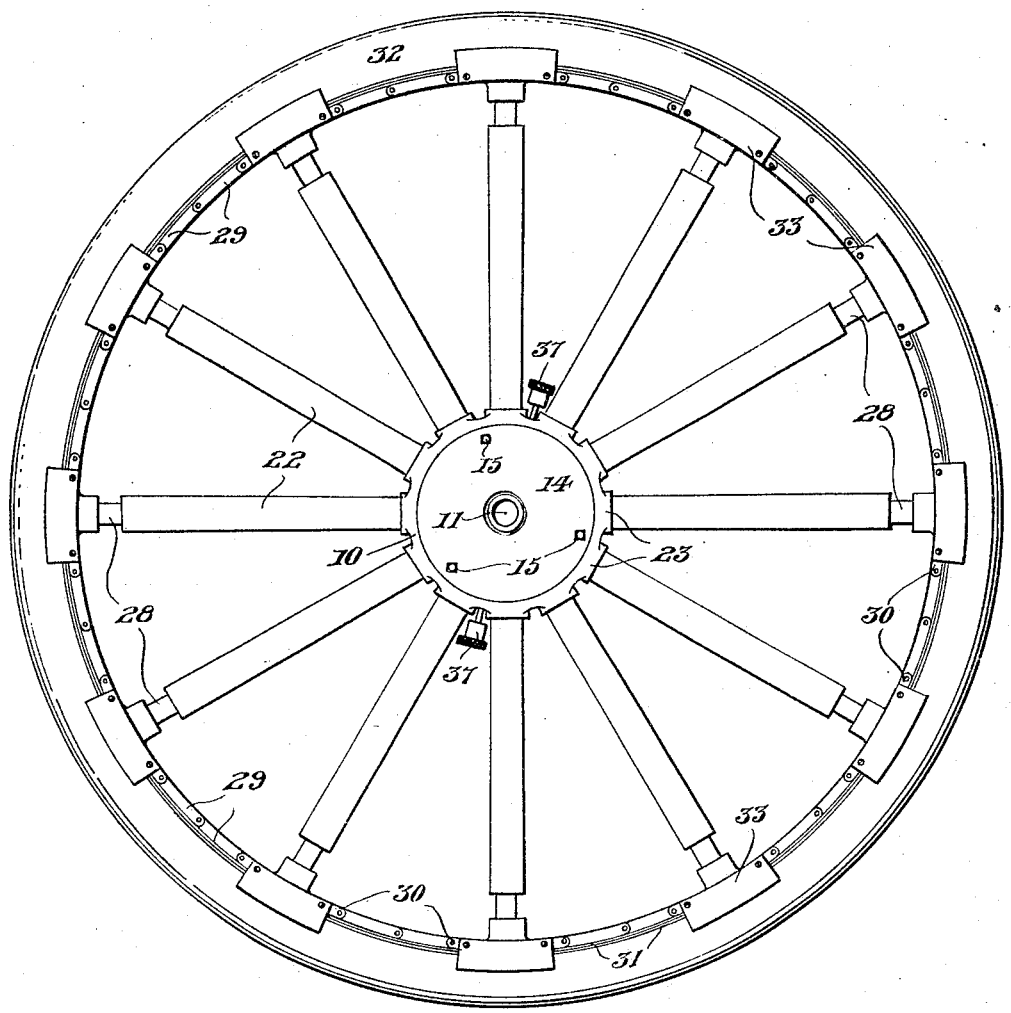

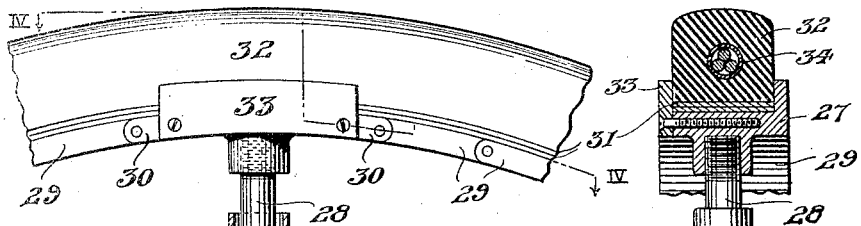

JOSEPH CHERPECH, OF LETHBRIDGE, ALBERTA, CANADA, ASSIGNOR OF ONE-HALF TO GEORGE GAVROS, OF LETHBRIDGE, ALBERTA, CANADA.

AUTOMOBILE-WHEEL.

1,332,486. Specification of Letters Patent. Patented Mar. 2, 1920.

Application filed May 20, 1919. Serial No. 298,511.

*To all whom it may concern:*

Be it known that I, JOSEPH CHERPECH, a citizen of Poland, residing at Lethbridge, in the Province of Alberta and Dominion of Canada, have invented certain new and useful Improvements in Automobile-Wheels, of which the following is a specification.

The primary object of the invention is the provision of a resilient vehicle wheel whereby the shocks and jars incident to travel are absorbed and vibrations of the vehicle thereby prevented.

A further object of the invention is to provide a spring wheel that possesses great strength for supporting heavy loads and is provided with resilient means affording all the shock-absorbing qualities of a pneumatic tire without having any inflated member likely to become punctured and accidentally deflated.

With these general objects in view the invention consists of the novel combination and arrangement of parts hereinafter fully described, in connection with the accompanying drawings and in which like reference characters designate corresponding parts throughout the several views.

In the drawings,

Figure 1 is an elevational view of the invention,

Fig. 2 is an enlarged sectional view of a portion thereof,

Fig. 3 is a further sectional view taken upon a plane perpendicular to the line of section of Fig. 2, Fig. 4 is a detail sectional view taken upon line IV—IV of Fig. 2, and Fig. 5 is a view partly in section illustrating the employment of a packing gland between the telescoping sections of a spoke member.

My invention comprises a cup-shaped hub 10 having an axle-receiving tube 11 centrally extending therethrough, and having a portion 12 projecting from the outer side of the hub 10 and furnished with the usual cap 13. A cover-plate 14 is removably secured to the hub 10 by bolts 15, the tube 11 projecting through a central opening 16, of the plate.

An annular rubber cushion 17 in the chamber 18 of the hub 10 has an expansion leaf-spring 19 upon its inner periphery surrounding the tube 11, while a similar spring 20 surrounds the cushion 17, bearing against the outer wall 21 of the chamber 18. Spokes are radially mounted upon the hub 10 each being formed in two parts, one part or section of each spoke being a tube 22 radially mounted in a boss 23 upon the hub 10 with the other portion or section of the spoke in the form of a plunger or rod 24 slidable in the tube 22.

A helical spring 25 is mounted in the inner end of each tube 22 extending through a radial bore 26 in the hub 10 in axial alinement with said tube, the spring 25 of each spoke having its inner end seated upon the spring 20 with the plunger 24 of such spoke seated upon the other end of the spring 25. A channel block 27 is secured to the outer reduced end 28 of each spoke plunger 24, flat links 29 being hingedly connected together and to end extensions 30 of the blocks 27.

Resilient metallic bands 31 surround the blocks 27 and links 29, passing through the channels of the blocks 27, the springs 31 serving as a seat or felly for a solid rubber tire 32. Each block 27 has one removable flange 33 whereby the tire 32 may be positioned upon the springs 31. Any form of solid rubber tire may be employed retained in any manner as by a tubular retaining member 34 having wires therein, and after the manner of the tires upon baby-carriage wheels and the like.

In Fig. 5 a packing gland is illustrated for the spokes, consisting of a binding collar 35 threaded upon the outer end of the spoke tube 22' and with a packing or gasket 36 retained in the collar, through which the plunger portion 28' slidably extends.

The complete operation of the invention will be fully understood from this detailed description thereof, the blocks 27 for mounting the tire 32 having the hub 10 resiliently mounted thereon by means of the springs 25, 20 and 19 and the cushion 17 so that the plungers 24 have the hub 10 resiliently mounted upon their inner ends and the weight of the load on the hub is cushioned upon the blocks 27 and tire 32 in this manner. The expansible properties of the leaf-springs 19 and 20 as well as the form of the rubber cushion 17 positioned therebetween, forms a centrally located cushioning means for the entire load carried by the hub when the wheel is employed upon a vehicle. Oil cups 37 may be provided upon the hub 10 between the spoke tubes 22 if desired.

While the form of the invention herein set forth is believed to be the preferable embodiment thereof, it will be understood that minor changes may be made therein without departing from the spirit and scope of my invention.

What I claim as new and desire to secure by Letters Patent is:

1. In combination with a hub having a chamber, an annular resilient cushion mounted in said chamber, tube members radially projecting from the hub, plunger members slidable in the tube members, resilient spacing means between said cushion and the adjacent inner ends of the plungers, and tire-mounting means upon the outer ends of the plunger.

2. A wheel comprising a hub having an inner chamber, an axle-receiving tube centrally projecting through the hub, a solid rubber cushion in the chamber, surrounding and spaced from said tube, leaf-springs within the chamber engaging the opposite sides of the cushion, a cover plate for the chamber carried by the hub with said tube projecting therethrough, and spoke members radially carried by the hub resiliently seated upon the outermost leaf-spring.

3. A wheel comprising a hub having an inner chamber, an axle-receiving tube centrally projecting through the hub, a solid rubber cushion in the chamber, surrounding and spaced from said tube, leaf-springs within the chamber engaging the opposite sides of the cushion, a cover plate for the chamber carried by the hub with said tube projecting therethrough, radial tubes outwardly projecting from the hub, the hub having radial bores in axial alinement with the bores of said tubes, helical springs extending through the inner ends of the tubes and the bores of the hub seated upon the outermist leaf-spring of said chamber, plungers slidable in said tubes mounted upon the helical springs, and a tire-holding means carried by the outer ends of said plungers.

In testimony whereof I affix my signature.

JOSEPH CHERPECH.